United States Patent Office 3,377,843
Patented Apr. 16, 1968

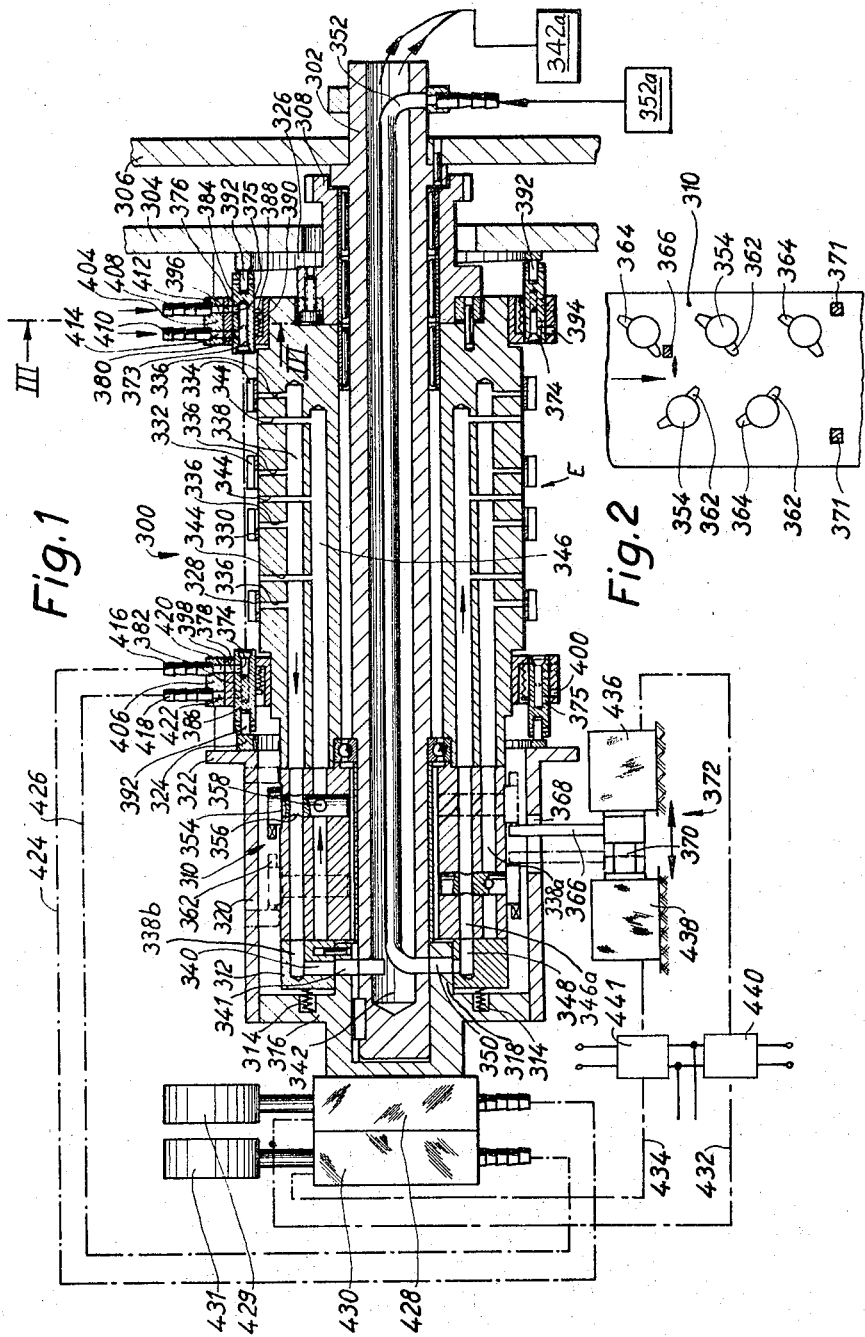

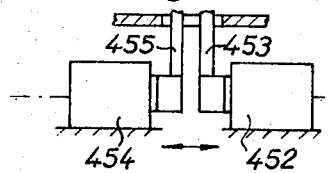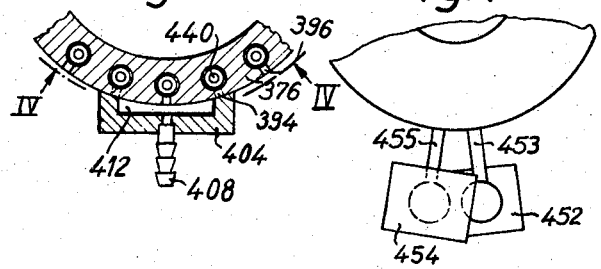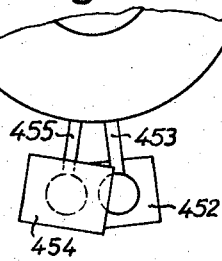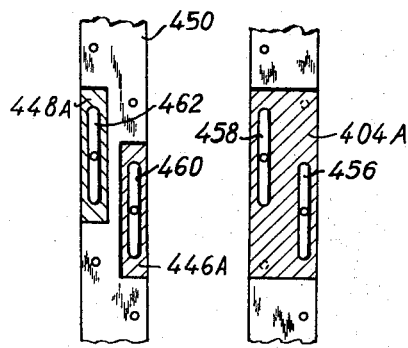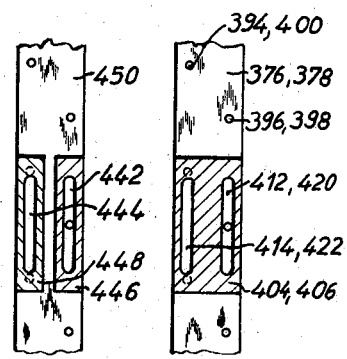

3,377,843
APPARATUS FOR TESTING CIGARETTES AND THE LIKE
Willy Rudszinat, Dassendorf, near Hamburg, Germany, assignor to Hauni-Werke Koerber & Co., KG., Hamburg-Bergedorf, Germany
Filed Jan. 20, 1966, Ser. No. 521,917
Claims priority, application Germany, Jan. 23, 1965, K 54,959
17 Claims. (Cl. 73—45.2)

ABSTRACT OF THE DISCLOSURE

Cigarettes are tested while travelling sideways in the flutes of a drum. Two successive cigarettes are tested simultaneously by passing threrethrough currents of air, and the characteristics of each air current are evaluated by a separate signal generator which initiates ejection of defective articles.

---

The present invention relates to a method and apparatus for testing cigarettes, cigars, filter cigarettes, filter cigars, filter rods and analogous articles wherein an open-ended tubular wrapper surrounds an air-permeable filler of tobacco and/or filter material. More particularly, the invention relates to improvements in a method and apparatus for testing such articles by streams of air.

It is well known that the condition of wrappers and/or fillers which form part of cigarettes or the like may be tested with streams of air which are caused to pass through the fillers and which thereby meet a certain resistance. By comparing the pressure of an air stream which has passed through a cigarette with a predetermined pressure which is indicative of a satisfactory cigarette, one can produce signals which are utilized to eject, destroy or otherwise dispose of defective articles.

Proposals to test articles which are advanced at a high speed (for example, to test cigarettes at the same rate at which they issue from a cigarette machine) include the provision of several testing conveyors and of a separate signal generator for each testing conveyor. The cigarettes are caused to advance from conveyor to conveyor, and each signal generator tests only certain articles on the respective conveyor. In this way, the length of intervals which are available for testing of individual articles is much longer than if a single signal generator were to test and to evaluate air streams which have passed through each consecutive article on a single conveyor. A serious drawback of such apparatus is that they occupy too much room, mainly because they require a plurality of testing conveyors and devices which transfer the articles from conveyor to conveyor, and also because each conveyor must be associated with separate conduits and other air conveying parts which admit air to and which guide air from the ends of articles.

Accordingly, it is an important object of the present invention to provide a novel method of testing rapidly moving cigarettes and similar articles in such a way that the articles can be tested by resorting to several signal generators but only to a single testing conveyor.

Another object of the invention is to provide a method of the just outlined characteristics according to which each rapidly moving article can be tested during an interval of time which is long enough to insure satisfactory passage of an air stream through the filler without resorting to air streams which are maintained at an excessively high or excessively low pressure such as might cause damage to the articles.

A further object of the invention is to provide an apparaus which may be utilized in practicing the above outlined method and to construct and assemble the apparatus in such a way that a plurality of articles may be tested in a simultaneous step despite the fact that all such articles may be moved in a single file by means of a single testing conveyor.

An additional object of the invention is to provide a novel ejecting unit which may be utilized in the improved apparatus to eject defective articles from the testing conveyor.

A concomitant object of the instant invention is to provide novel arrangements for conveying air streams to and from the ends of articles while the articles travel with the testing conveyor.

Still another object of the invention is to provide such arrangements with improved distributors which can regulate the flow of air streams at the actual testing station.

A further object of the invention is to provide a testing apparatus which can be readily combined with or incorporated in existing filter machines, cigar machines, cigarette machines and/or other machines which produce rod-shaped articles with tubular wrappers and air-permeable fillers.

Briefly stated, one feature of my present invention resides in the provision of a method of testing filter rods, filter cigarettes, filter cigars and analogous articles of the type wherein an open-ended tubular wrapper surrounds an air-permeable filler which may consist of one or more rod shaped sections. The method comprises the steps of conveying several groups of articles sideways in a single file wherein the articles are equidistant from each other, conveying through the filler of each article an air stream while the article moves sideways whereby a satisfactory article offers to the flow of such air a resistance which is different from the resistance offered by a defective article, comparing the pressure of air streams which issue from the thus tested articles of each group with preselected pressures which are indicative of satisfactory articles, and ejecting from the file each such defective article whose filler was traversed by an air stream found to have a pressure which differentiates from the preselected pressure.

The articles may be arranged in two groups and the articles of one group then alternate with the articles of the other group. The conveyor which advances the articles in the course of the testing operation preferably comprises a rotary drum which moves the articles in a single arcuate path from a first to a second transfer station where the articles are respectively fed onto and removed from the drum. Defective articles are ejected upstream of the second transfer station so that each article which leaves the drum at the second transfer station is a satisfactory article.

Each group of articles is tested by a separate signal generator which can compare the actual pressure of an air stream with a preselected pressure, and such signal generators may send signals to a common ejector or to separate ejectors.

The novel features which are considered as characteristic of the invention are set forth in particular in the appended claims. The improved testing apparatus itself, however, both as to its construction and its mode of operation, together with additional features and advantages thereof, will be best understood upon perusal of the following detailed descrpition of certain specific embodiments with reference to the accompanying drawings, in which:

FIG. 1 is an axial section through the conveyor of a testing apparatus which embodies one form of my invention and which comprises two signal generators;

FIG. 2 is a fragmentary developed view of a rotary valve housing which forms part of the apparatus shown in FIG. 1;

FIG. 3 is a fragmentary section substantially as seen in the direction of arrows from the line III—III of FIG. 1 and shows an air-admitting distributor or shoe which is disposed at one axial end of the conveyor;

FIG. 4 is a section through the distributor, substantially as seen in the direction of arrows from the line IV—IV of FIG. 3;

FIG. 5 is a similar section through a two-piece distributor;

FIG. 6 illustrates a portion of a modified testing apparatus wherein the means which effects ejection of defective articles comprises two separate electromagnets;

FIG. 7 is a fragmentary end elevational view of the modified apparatus as seen from the left-hand side of FIG. 6;

FIG. 8 is a section similar to that of FIG. 4 and illustrates a modified distributor which is formed with circumferentially staggered air-admitting slots;

FIG. 9 is a similar section and shows a two-piece distributor with circumferentially staggered slots;

Figures 10, 11:
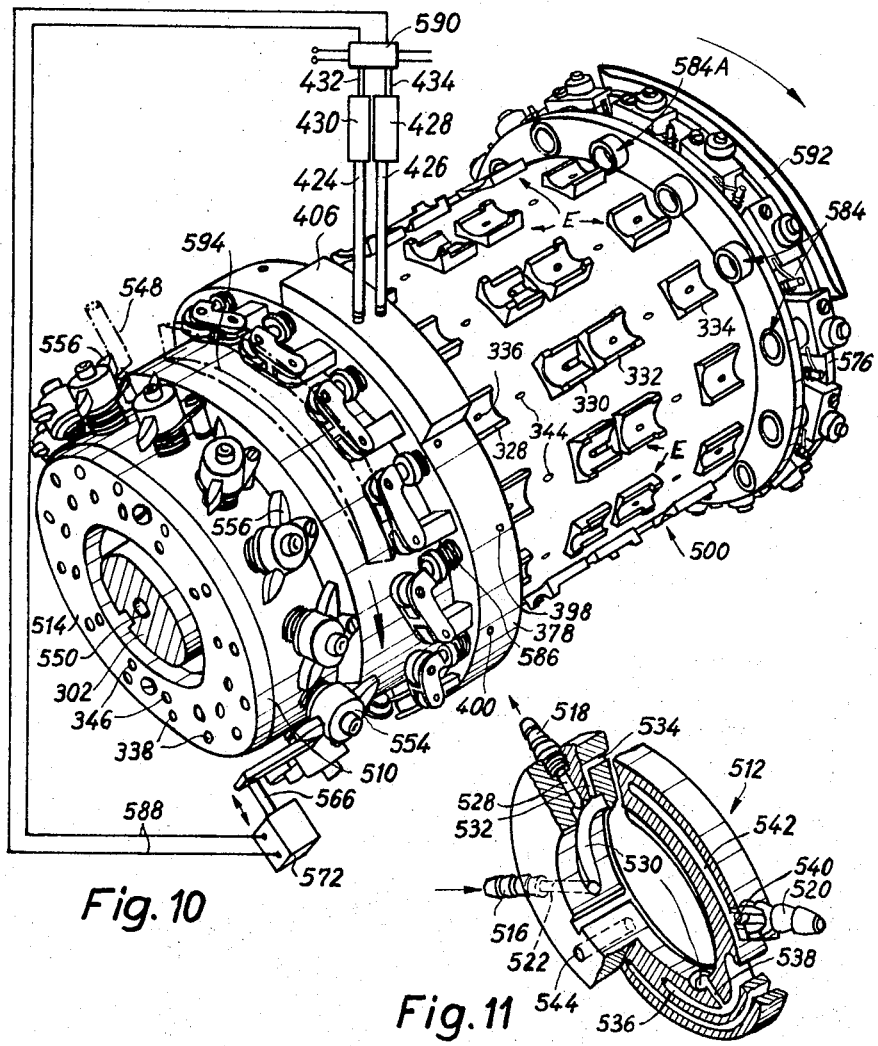
FIG. 10 is a perspective view of a portion of a further testing apparatus with certain parts broken away.
FIG. 11 is a fragmentary perspective view of a valve member which forms part of the testing apparatus shown in FIG. 10.

Referring first to FIG. 1, there is shown a conveyor including a testing drum 300 which is rotatable on a fixed shaft 302 mounted in one of two spaced supporting walls or frame members 304, 306. The drive for the testing drum 300 includes a sprocket wheel 308 which is rotatably supported by the shaft 302 between the walls 304, 306 and extends through an aperture of the wall 304. The hub of this sprocket wheel 308 is bolted to the right-hand end of the testing drum 300. The left-hand end of the drum is connected with a valve housing 310 which rotates therewith in response to rotation of the sprocket wheel 308 which is driven by a chain (not shown). The left-hand end face of the valve housing 310 is adjacent to an annular valve member 312 which is biased by helical springs 314 so that it remains in end-to-end abutment with the housing 310. The left-hand end convolutions of the springs 314 bear against a stationary cover or cap 316 which is keyed to the left-hand end portion of the shaft 302. The cover 316 has a hub 318 which serves as a bearing for the valve member 312. This cover is further connected to or integral with a cylindrical mantle or shell 320 which surrounds the valve housing 310. The right-hand end portion of the mantle 320 is provided with an annular flange 322 which carries an annular cam 324 concentric with the shaft 302. A second annular cam 326 is connected to the left-hand side of the supporting wall 304 and its cam face is also concentric with the shaft 302.

The periphery of the testing drum 300 carries two groups of axially parallel pockets E each of which comprises a row of aligned trough-shaped sockets 328, 330, 332, 334. Each such pocket E may accommodate a cigarette or cigar of unit length, a filter cigarette or cigar of double unit length, or a filter rod or mouthpiece rod of multiple unit length, depending upon whether the apparatus is used for testing of cigarettes, cigars or filter rods. Each of the sockets 328, 330, 332, 334 is formed with a radially extending suction port 336 which registers with a radial suction port 336 of the drum 300 and communicates with one of several axially parallel suction channels 338 machined into the body of the drum 300. In other words, the drum 300 is provided with an annulus of axially parallel suction channels 338 whose total number equals the combined number of all sockets 328, 330, 332, 334 divided by four. Otherwise stated, one suction channel 338 is provided for each row of sockets or for each pocket E. The suction channels 338 resemble blind bores and communicate with similar channels 338a provided in the valve housing 310. The left-hand ends of channels 338a can communicate with an arcuate channel 338b in the valve member 312, and the channel 338b in turn communicates with a radially inwardly extending suction channel 340. The channel 340 communicates with a radially extending suction channel 341 machined into the hub 318 of the cover 316, and the inner end of the suction channel 341 communicates with an axially extending suction channel 42 provided in the stationary shaft 302. The right-hand end of the channel 342 is connected to a suction fan 342a or to an analogous suction generating device which can draw currents of air through the channels 336 to thereby temporarily retain the articles in the corresponding pockets E of the testing drum 300 while the articles travel from a first to a second transfer station and past a testing station.

The testing drum 300 is further provided with groups of pressure ducts 344, three for each pocket E. As shown in FIG. 1, each pressure duct 344 extends radially outwardly between two adjoining sockets 328, 330 or 330, 332 or 332, 334. The inner ends of the ducts 344 communicate with pressure channels 346 which are parallel with the axis of the drum 300 and resemble blind bores having open ends adjacent to the valve housing 310. The channels 346 communicate with similar pressure channels 346a machined into the housing 310 and may communicate with an arcuate pressure channel 348 machined into the valve member 312. The channel 348 communicates with a radially inwardly extending pressure channel 350 connected with a pressure conduit 352 which extends into the suction channel 342 of the shaft 302. The channel 350 extends from the testing station toward the second transfer station. The intake end of the conduit 352 is connected to an air compresser 352a or another suitable source of compressed gas.

The means for regulating the flow of air through the channels 338–338b and 346, 346a, 348 comprises two annular groups or rows of rotary regulating valves 354. The stems of the valves 354 extend radially of an arc rotatable in the valve housing 310, and each such stem is provided with two diametral bores 356, 358 which cross each other in space at an angle of 90 degrees. The valves 354 may be adjusted in such a way that the bores 356 register with the corresponding suction channels 338a while the bores 358 are sealed from the corresponding pressure channels 346a, or vice versa. In other words, each valve 354 can seal one of the pressure channels 346 from the compressor 352a while permitting flow of suction air from a suction channel 338 to the fan 342a, or vice versa. The heads of the valves 354 extend radially beyond the periphery of the valve housing 310 and carry pairs of motion transmitting projections 362, 364 (shown in FIG. 2) which are located substantially diametrically opposite each other.

The means for moving the valves 354 from their normal or first positions comprises a lever 366 which extends radially inwardly through an elongated axially parallel slot 368 provided in the mantle 320. This lever 366 forms part of an armature 370 which in turn forms part of an electromagnet 372 shown in the lower part of FIG. 1 below the mantle 320. The lever 366 is movable from a central or neutral position in which it can be bypassed by the projections 362, 364 to either one of two end positions shown in FIG. 1 (one end position is shown by solid lines and the other end position is shown by phantom lines). This is necessary because the regulating valves 354 are disposed in two rows or groups and the valves of the two groups are staggered circumferentially of the valve housing 310. The staggered distribution of regulating valves 354 is best shown in FIG. 2. This illustration further shows fixed return members 371 which are mounted in the mantle 320 and can automatically reset such valves 354 which were rotated by the lever 366. In other words, the lever 366 serves as a means for rotating the valves 354 in one direction (out of their normal or first positions) and the members 371 serve to return each of the thus rotated valves 354 from a second position back to normal position.

The two end portions of the testing drum 300 are surrounded by annular valve carriers 376, 378. The distance between the carriers 376, 378 exceeds somewhat the axial length of articles which are to be tested while resting in the pockets E consisting of sockets 328, 330, 332, 334. These carriers are respectively provided with axially parallel bores or recesses 380, 382 each of which registers with one of the pockets E. Thus, the recesses 380 of the right-hand carrier 376 register with the rightmost sockets 334, and the recesses 382 of the left-hand carrier 378 register with the leftmost sockets 328. These recesses respectively accommodate reciprocable apertured sealing devices 384, 386, and the radially inner side of each sealing device 384, 386 is provided with an extension 388 which is biased by a spring 390. The springs 390 serve to bias the sealing devices 384, 386 axially of the drum 300 and toward the faces of the cams 326, 324. Each of these sealing devices comprises a roller follower 392 which can track the respective cam face. As clearly shown in FIG. 1, the faces of the cams 324, 326 slope upwardly and toward each other so that the distance between these cam faces varies at a preselected rate required to effect axial displacement of the sealing devices 384, 386. Each of these sealing devices is further provided with a radially outwardly extending bore 374 or 375. The bores 375 are nearer to the respective cams 324, 326, than the bores 374. When the drum 300 rotates, the bores 374, 375 move back and forth in response to the action of cams 324, 326.

The carrier 376 is formed with two rows or groups of radially outwardly extending testing bores 394, 396, and the carrier 378 has two rows of similar testing bores 398, 40. The combined number of testing bores 394, 396 in the carrier 376 equals the number of pockets E on the drum 300, and the same holds true for the testing bores 398, 400 of the carrier 378. In other words each pocket E is disposed between two testing bores one of which is provided in the carrier 376 and the other of which is provided in the carrier 378.

The testing bores 394, 396 are staggered in the circumferential direction of the carrier 376 so that their distribution corresponds to that of the pockets E. The testing bores 398, 400 of the carrier 378 are staggered in the same way. Each testing bore 394 is aligned with a bore 400, and each testing bore 396 is aligned with a bore 398, as seen in the axial direction of the drum 300. The distance between aligned testing bores 394, 400 is the same as that between aligned testing bores 396, 398, see FIG. 4.

The actual testing station is adjacent to the upper portion of the drum 300, as viewed in FIG. 1. Each pocket E which is located at the testing station carries an article which is indicated in FIG. 1 by phantom lines. For example, the article may be a filter cigarette or a filter rod of multiple unit length. At the testing station, there is provided a first fixed one-piece distributor or shoe 404 which is adjacent to the preiphery of the carrier 376, and a second fixed one-piece distributor or shoe 406 which is adjacent to the periphery of the carrier 378. The shoe 404 carries two nipples or inlets 408, 410 each of which can admit a stream of testing air. The shoe 404 is further provided with two elongated slots 412, 414 which are also shown in FIG. 4 and respectively communicate with the nipples 408, 410. When the carrier 376 rotates with the drum 300, the slots 414, 412 respectively communicate with consecutive testing bores 394, 396. The shoe 406 has similar slots 420, 422 which respectively communicate with nipples or outlets 416, 418 and with testing bores 398, 400. The length of slots 414, 412 approximates the distance between two adjoining testing bores 394, or 396, i.e., the distance between first, third, fifth, etc., pockets E on the drum 300. However, and as clearly shown in FIG. 3 or 4, the slot 412 or 414 cannot communicate with two testing bores 396 or 394 at a time. The length of slots 420, 422 is selected in the same way, i.e., each of these slots can communicate with one testing bore 398 or 400 at a time.

Conduits 424, 426 connect the nipples 416, 418 of the carrier 378 with two signal generators 428, 430 which are shown in the left-hand part of FIG. 1. The signal generators evaluate the air streams and produce impulses whenever the actual pressure of an air stream differentiates from an optimum pressure such as is indicative of a satisfactory article. Conductors 432, 434, connect the signal generators 428, 430 with two coils 436, 438 of the electromagnet 372.

Signal storing units 440, 441 are respectively installed in the conductors 432, 434. These units are connected with a source of electrical energy and with the programming system of the testing apparatus.

Manometers 429, 431 enable the operator to observe the pressure of air streams which have passed through the articles at the testing station. These manometers are respectively connected with the signal generators 428, 430. In the embodiment of FIG. 1, the generators produce electrical signals which cause energization of the coils 436, 438.

The operation of the heretofore described testing apparatus is as follows:

The sprocket wheel 308 is driven to rotate the testing drum 300 and a suitable conveyor delivers articles into consecutive pockets E at the first transfer station upstream of the testing station in a manner well known from the art of conventional testing apparatus. The nipples 408, 410 of the right-hand shoe 404 are connected to the compressor 352a or to another suitable source of compressed air which is maintained at a predetermined pressure. The compressor 352a is in operation and sends a stream of compressed air into the conduit 352. The suction fan 342a draws air from the channel 342 of the shaft 302. The regulating valves 354 are in their normal positions in which the bores 356 communicate with the suction ports 336 so that the articles which are deposited in the pockets E are held by suction while moving from the first transfer station, past the testing station, and toward the second transfer station. As stated, the articles are fed to the drum 300 at the first transfer station which is located upstream of the testing station and at which the aligned sealing devices 384, 386 are sufficiently spaced from each other to permit entry of articles into the pockets E therebetween. The aligned sealing devices 384, 386 are biased away from each other by the springs 390 to the extent determined by the annular faces of the fixed cams 324, 326 which are tracked by the followers 392. While the sealing devices 384, 386 travel toward the testing station, the cams 324, 326 cause them to move toward each other and their sleeve-like sealing portions 584A (see FIG. 10) receive the adjoining end portions of the articles to prevent uncontrolled entry or escape of air during testing. The thus applied sealing devices 384, 386 then travel past the shoes 404, 406. When a testing bore 396 of the right-hand carrier 376 communicates with the slot 412 of the shoe 404, the nipple 408 admits a stream of testing air which flows through the outer bore 375 of the respective sealing device 384 and through a central bore or aperture 373 to enter the filler at the right-hand end of the respective article. The apertures 373 pass axially through the sleeve-like portions 584A of the sealing devices 384, 386. When the bore 375 of a sealing device 384 receives air from the nipple 408 of the shoe 404 and the corresponding testing bore 396 is located midway between the ends of the slot 412, the slot 414 is sealed from the bores 394 because the slots 412, 414 are not staggered with reference to each other in the circumferential direction of the carrier 376, see FIG. 4. Since the slot 412 is relatively long, air can penetrate through the filler of an article for an interval of time whose duration corresponds to the time necessary to rotate the drum 300 through an angle corresponding to the distance between two consecutive testing bores 396. Consequently, the drum 300 can be driven at a very high speed without affecting the testing operation.

The air stream which is admitted by a central aperture 373 of a right-hand sealing device 384 flows through the filler of the corresponding article and enters the central aperture 373 of the aligned left-hand sealing device 386. Such stream enters the bore 374 of the sealing device 386 and flows outwardly through the bore 398 of the carrier 378, through slot 420, nipple 416 and conduit 424 on to the signal generator 428. The signal generator 428 produces a signal only when the actual pressure of the incoming air stream is outside of a preselected pressure range, namely, a pressure range which is indicative of satisfactory articles whose wrappers are without leaks and/or whose fillers are not too dense or too loose. Satisfactory articles remain in their pockets E and are advanced to the second transfer station to be removed from their pockets for delivery to storage or to a further processing machine. Satisfactory filter rods can be fed to a filter cigarette machine, a filter cigar machine or a filter machine which produces so-called multiplex filter mouthpieces whose fillers consist of two or more filter materials.

If the signal generator 428 detects that the pressure of the air stream which has passed through a defective article is too high or too low, it produces an electric signal which is transmitted through the conductor 432 and on to the signal storing unit 440. Depending on the speed of the drum 300, the unit 440 energizes the coil 436 in time to shift the lever 366 of the armature 370 from the neutral position to the right-hand end position shown in FIG. 1 by solid lines. The lever 366 then trips the regulating valve 354 for the pocket E of the defective article to seal the suction fan 342a from the corresponding suction parts 336 and to simultaneously connect the compressor 352a with the corresponding ducts 344 so that the defective article is ejected by three jets of compressed air and is removed from the drum 300 at an ejecting station which is located between the testing station and the aforementioned second transfer station. The lever 366 turns the corresponding regulating valve 354 through an angle of 90 degrees. The valve 354 is then returned to its normal position while moving along the associated return member 371. Such return movement of the valve 354 to normal position takes place before the corresponding pocket E reaches the first transfer station so that the pocket is ready to receive and to retain a fresh article.

A second article (which follows the just described article) is tested immediately after or simultaneously with testing of the preceding article. The ends of the second article are sealed by the corresponding sealing devices 384, 386 in response to travel of their followers 392 along the converging portions of cams 324, 326. However, the second article is tested by a stream of air which is admitted through the nipple 410 and slot 414 of the shoe 404. Such air stream flows through the corresponding testing bore 394 and the bore 374 of the right-hand sealing device 384. The stream issuing from the second article flows through the bore 375 of the corresponding left-hand sealing device 386, through the registering testing bore 400 of the shoe 406, through the conduit 426 and on to the second signal generator 430. If the evaluation of the air stream which enters the signal generator 430 indicates that the second article is defective, the generator 430 sends an electric signal through the conductor 434 and to the signal storing unit 441 which energizes the coil 438 with a certain delay to make sure that after assuming its phantom line left-hand end position, the lever 366 of the armature 370 will trip the corresponding valve 354 in order to bring about ejection of the second article from its pocket E.

Since the apparatus of FIG. 1 comprises a single electromagnet 372 which controls all of the regulating valves 354, the signal generators 428, 430 and their associated signal storing units 440, 441 are preferably adjusted in such a way that the signal storing units cannot simultaneously energize the coils 436, 438, i.e., that the ejection of two consecutive defective articles cannot take place in a simultaneous step. This is achieved by the aforedescribed distribution of testing bores 394, 396, 398, 400 and by such dimensioning of slots 412, 414, 420, 422 that each such slot can communicate with only one testing bore at a time. In FIGS. 3 and 4, the length of a slot equals exactly the distance between the centers of two consecutive testing bores 394, 396, 398 or 400 minus the diameter of a testing bore. In this way, the apparatus insures that the admission of air into the first article via nipple 408 is terminated prior to admission of air into the third article and that the admission of air into the second article via nipple 410 is terminated prior to admission of air into the fourth article, and so on. Therefore, the apparatus of FIG. 1 can operate properly by utilizing only two signal generators 428, 430. As stated before, the signal storing units 440, 441 insure that two consecutive defective articles cannot be ejected at the same time even in the event that such defective articles are accommodated in two consecutive pockets E.

It will be seen that the number of signal generators equals the number of groups of pockets E on the drum 300 and that the heretofore described apparatus comprises two groups of equidistant pockets whereby the pockets of one group alternate with the pockets of the other group. The parts 378, 386, 406, 424, 426 constitute a connecting arrangement which connects each of the signal generators 428, 430 with first or left-hand ends of articles in consectuive pockets E of the respective groups of pockets. The parts 376, 384, 404, 352a constitute an air conveying arrangement which admits air streams to second or right-hand ends of articles while the first ends of articles are connected with the respective signal generators so that the air streams flow through the fillers.

The apparatus of FIG. 1 may be provided with three or more signal generators each of which can test a group of articles. In such modified apparatus, the distributors 404, 406 will be formed with three or more slots and each of the carriers 376, 378 will be formed with three or more rows of testing bores. If the apparatus comprises three signal generators, one such signal generator may evaluate air streams which have passed through the fillers of first, fourth, seventh, tenth, etc. articles; the second signal generator will perform the same function for second, fifth, eighth, etc. articles; and the third signal generator will perform the same function for third, sixth, ninth, etc. articles. The testing drum can be driven at a higher speed without reducing the length of intervals for testing of individual articles if the number of signal generators is increased. The number of rows of testing bores in a carrier may but need not be the same as the number of signal generators. For example, if a carrier is provided with three rows of testing bores, two rows may form a single group whose bores can be caused to convey air streams to a single signal generator.

FIG. 5 illustrates a portion of a slightly modified testing apparatus wherein the distributor or shoe 404 and/or 406 is replaced by a two-piece shoe 446, 448 each section of which is provided with a single slot 442, 444, respectively. In other words, the apparatus may comprise two shoes composed of a total of two, three or four parts or sections. The numeral 50 denotes a carrier which corresponds to the carrier 376 or 378 of FIG. 4.

The electromagnet 372 of FIG. 1 may be replaced by two separate electromagnets 452, 454 shown in FIGS. 6 and 7. The armatures of the electromagnets 452, 454 respectively comprise levers 453, 455. If the testing apparatus comprises two independent electromagnets, it can eject two defective articles at a time. The levers 453, 455 replace the lever 366 of FIG. 1 and each thereof can trip one row or group of regulating valves 354.

FIG. 8 shows a two-piece distributor or shoe 446A, 448A which may be used in a testing apparatus having the electromagnets 452, 454 of FIGS. 6 and 7. The slots 460, 462 are staggered in the circumferential direction of the carrier 450 by a distance corresponding to that between two adjoining pockets E. FIG. 9 shows a one-piece shoe 404A which is provided with two staggered slots 456, 458 corresponding to the slots 460, 462 of FIG. 8. By using shoes of the type shown in FIGS. 8 and 9, the testing apparatus can test two articles at a time.

FIGS. 10 and 11 illustrate the drum 500 of a further testing apparatus which is similar to the apparatus of FIG. 1. Such parts of the apparatus shown in FIGS. 10 and 11 which are identical or obviously analogous to the corresponding parts of the structure shown in FIG. 1 are identified by similar reference numerals. Note the axially extending channels 338, 346, the annular carrier 378 with testing bores 398, 400, the distributor or shoe 406, the conduits 424, 426 and signal generators 428, 430, the conductors 432, 434 and the fixed shaft 302. FIG. 10 further shows a series of axially parallel pockets E each of which comprises four aligned sockets 328, 330, 332, 334.

The shaft 302 is formed with an axially extending bore 550 which admits testing air to apertured sealing devices 584 corresponding to the sealing devices 384 of FIG. 1. The distributor 404 is omitted because the sealing devices 584 receive testing air from the interior of the drum 500. The sealing devices 584 are mounted in an annular carrier 576 which rotates with the drum 500 and which need not be provided with radially outwardly extending testing bores such as the bores 394, 396 of the carrier 376 shown in FIG. 1.

The flow of air through the channels 338, 346 of the drum 500 is controlled by regulating valves 554 which form a single row or group and are mounted on a valve housing 510. An electromagnet 572 has an armature 566 which can reciprocate radially of the drum 500 (see the double-headed arrow in FIG. 10) to move into or from the path of projections 556 on the valves 554. The electromagnet 572 is connected with conductors 588 leading to a signal storing unit 590 which is connected with the aforementioned conductors 432, 434. The unit 590 is connected with a source of electrical energy and with the programming system of the testing apparatus. The purpose of the unit 590 is to energize the electromagnet 572 with a delay which is necessary to insure that the armature 566 will trip a certain regulating valve 554, namely, that valve which can cause ejection of a defective article from the corresponding pocket E by sealing the respective channel 388 from the suction fan and by simultaneously connecting the respective channel 346 with the air compressor.

The sealing devices 584, 586 are respectively reciprocated by arcuate cams 592, 594 which are fixed to a stationary frame member and are respectively adjacent to the carriers 576, 378. The cams 592, 594 need not form circumferentially complete annuli. The length of the distributor 406 is such that it always overlies two testing bores 398, 400. The slots 420, 422 of the distributor 406 may be aligned as shown in FIG. 4 or staggered as shown in FIG. 9.

FIG. 11 illustrates an annular valve member 512 which replaces the valve member 312 of FIG. 1 and regulates the admission and escape of air through the channels 338, 346. The member 512 resembles a ring and is mounted on the shaft 302 so that it cannot rotate with the drum 500. It is formed with an air-admitting nipple or inlet 516, with an air-evacuating nipple or outlet 520, and with a third nipple 518. The right-hand end face of the valve member 512 abuts against the left-hand end face 514 of the valve housing 510. The nipples 516, 518 respectively communicate with radial bores 522, 528 which in turn communicate with an arcuate channel 530. The channel 530 communicates with an axially parallel bore 534 through a radially outwardly extending bore 532. The bore 532 is located at the same distance from the axis of the drum 500 as the suction channels 338 so that it communicates with consecutive suction channels when the drum rotates.

A second arcuate channel 536 of the valve member 512 is provided in the region of the second transfer station, i.e., where the tested articles leave the drum 500 to be advanced to storage or to a further processing station. The channel 536 communicates with a radial bore 538 and can communicate with the pressure channels 346 when the drum 500 rotates. The nipple 520 communicates with a bore 540 and through this bore with a third arcuate channel 542 of the valve member 512. The channel 542 extends along that portion of the path of sealing devices 586 in which the articles travel with the drum 500, namely, from the first to the second transfer station. This channel 542 communicates with all such suction channels 338 which are located between the two transfer stations.

A bypass bore 544 is located at such a distance from the axis of the shaft 302 that it can communicate with consecutive suction channels 338 when the drum 500 rotates. The flow of air through the channels 338 and 346 is controlled by the regulating valves 554 in the same way as described in connection with FIG. 1. It will be noted that the armature 566 of the electromagnet 572 is movable in the radial direction of the drum 500 whereas the lever 366 of the armature 370 shown in FIG. 1 reciprocates in the axial direction of the drum 300. A return member 548 shown in FIG. 10 performs the same function as the members 371 of FIG. 2 by rotating back to normal position each such valve 554 which has been tripped by the armature 566. The return member 548 extends into the path of projections 556 on valves 554 which have caused blasts of compressed air to eject defective articles from the corresponding pockets E. A single return member 548 suffices in the apparatus of FIG. 10 because the regulating valves 554 are arranged in a single row.

The air admitted through the nipple 516 will clean the channels 338 and the parts 336 of the sockets 328, 330, 332, 334 before the corresponding pockets E reach the first transfer station to receive fresh rod-shaped articles.

The exact construction of the signal generators forms no part of my present invention. Such signal generators may be constructed in a manner as disclosed, for example, in the copending application Serial No. 431,355 of Esenwein which is assigned to the same assignee.

In FIG. 10, the first transfer station is located behind the drum 500 and the second transfer station is located between the ejecting means including the electromagnet 572 and the first transfer station. As indicated by the arrow, the drum 500 rotates in a clockwise direction so that each pocket E receives a fresh article at the first transfer station and such articles then advance past the testing station (distributor 406), past the ejecting station and on to the second transfer station. At the second transfer station, all satisfactory articles are transferred onto a further conveyor for delivery to a filter cigarette machine, a filter cigar machine, a multiplex filter machine or to storage. Defective articles are ejected from their pockets E before they can reach the second transfer station.

The method and apparatus of my invention overcome certain serious drawbacks of presently known methods and apparatus. Thus, in order to test rapidly travelling articles which are advanced by a single conveyor, heretofore known testing apparatus comprise a single signal generator. Therefore, the intervals allotted for testing of individual articles are very short and the streams of testing air must be maintained at a high pressure whereby particles of shredded tobacco or filter material are likely to be expelled or sucked from the ends of tested articles. By providing a plurality of signal generators which can test the articles simultaneously, I insure that each article can be tested during a longer interval of time and that the streams of testing air need not be maintained at an excessive pressure.

It is clear that the apparatus of my invention can be used for testing of articles with streams of air which is conveyed at subatmospheric or at superatmospheric pressure. For example, the nipples 408, 410 of FIG. 1 may be connected to a suction fan so that the streams of testing air enter via sealing devices 386 and leave via sealing devices 384. In such modified apparatus, the signal generators 428, 430 may be connected with the nipples 408, 410 or with the nipples 416, 418.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. An apparatus for testing articles of the type wherein an open-ended tubular wrapper surrounds an air-permeable filler, comprising a single conveyor having a plurality of groups of pockets adapted to support the articles for sidewise movement with the conveyor; a plurality of signal generators, one for each of said groups of pockets and each arranged to compare the pressure of an air stream with a preselected pressure and to produce a signal when the pressure of the air stream deviates from such preselected pressure; a connecting arrangement for connecting each signal generator with first ends of articles in consecutive pockets of the respective group when the conveyor moves; an air conveying arrangement for permitting simultaneous flow of air streams between the first and second ends of articles in different groups while the first ends are connected with the respective signal generators so that the air streams can be evaluated simultaneously by the respective signal generators; and ejecting means for ejecting from its pocket each such article whose filler has been traversed by an air stream which has caused the generation of a signal.

2. An apparatus as set forth in claim 1, wherein said ejecting means comprises a single ejector which receives signals from all of said signal generators.

3. An apparatus as set forth in claim 1, wherein said signal generators produce electric signals and said ejecting means comprises a source of compressed air, separate valves for regulating the flow of air from said source to each of said pockets, each of said valves being movable between a first position in which the air coming from said source can eject an article from the respective pocket and a second position in which the air is prevented from ejecting such article, and electromagnetic means responsive to signals produced by said signal generators for moving the respective valves to first positions.

4. An apparatus as set forth in claim 3, wherein said ejecting means further comprises signal storing means interposed between said signal generators and said electromagnetic means for effecting ejection of unsatisfactory articles with a predetermined delay following the comparison of the respective air streams.

5. An apparatus as set forth in claim 1, wherein said conveyor comprises a rotary drum and said pockets are disposed on the periphery and are parallel with the axis of said drum, at least one of said arrangements comprising a carrier adjacent to one end of each pocket, apertured sealing devices mounted in said carrier and movable into and from sealing engagement with the respective ends of articles while the articles are supported by said pockets, a plurality of rows of testing bores provided in said carrier, one row for each group of pockets and each communicating with one of said sealing devices when the latter seals the respective end of the adjoining article so that an air stream can flow through the filler of the article and through the sealing device, and a stationary distributor having a plurality of air-conveying slots, one for each row of testing bores and each registering with consecutive testing bores of the respective row in response to rotation of said drum.

6. An apparatus as set forth in claim 5, wherein the testing bores of each row are equidistant from each other and wherein the length of each slot approximates the distance between a pair of adjoining testing bores in the respective row.

7. An apparatus as set forth in claim 6, wherein the articles are tested by streams of air which is maintained at superatmospheric pressure and wherein each of said arrangements comprises a carrier, a distributor and one sealing device for each of said pockets, each testing bore of one of said carriers being aligned with a testing bore of the other carrier, the carrier of said connecting arrangement having a plurality of outlets each communicating with one of the respective slots and each connected with one of said signal generators.

8. An apparatus as set forth in claim 7, wherein the testing bores of each of said carriers are staggered in the circumferential direction of the drum and wherein the distance between each pair of aligned testing bores is the same.

9. An apparatus as set forth in claim 8, wherein each row of testing bores forms an annulus located in a plane which is normal to the axis of said drum.

10. An apparatus as set forth in claim 5, wherein each testing bore of said carrier is aligned with one of said pockets.

11. An apparatus as set forth in claim 5, wherein said slots are staggered in the circumferential direction of the drum by a distance corresponding to that between two adjoining pockets.

12. An apparatus as set forth in claim 5, wherein the length of each slot equals the distance between two adjoining testing bores of the respective row minus the diameter of a bore.

13. An apparatus as set forth in claim 3, wherein said valves are disposed in a plurality of rows, one for each of said groups.

14. An apparatus as set forth in claim 13, wherein said valves are disposed in two rows and wherein the valves of one row are staggered with reference to the valves of the other row.

15. An apparatus as set forth in claim 1, wherein said pockets are arranged in two groups and wherein the pockets of one group alternate with the pockets of the other group.

16. An apparatus as set forth in claim 15, wherein said conveyor is a rotary drum and said pockets are distributed at equal intervals on the periphery of said drum, each of said arrangements comprising apertured sealing devices each movable into and out of sealing engagement with the respective end of an article, and means for moving said sealing devices axially of said drum.

17. An apparatus as set forth in claim 1, wherein each of said signal generators comprises means for indicating the pressure of consecutively tested air streams.

References Cited

UNITED STATES PATENTS

| | | | |
|---|---|---|---|
| 2,293,290 | 8/1942 | Gammeter | 73—45.1 X |
| 2,951,364 | 9/1960 | Sherrill | 73—45.2 |
| 3,237,444 | 3/1966 | Kaeding et al. | 73—45.1 |
| 3,266,295 | 8/1966 | Williamson | 73—38 |
| 3,270,551 | 9/1966 | Schmalz | 73—45.1 |

LOUIS R. PRINCE, *Primary Examiner.*

J. NOLTON, *Assistant Examiner.*